(12) United States Patent
Aoyagi et al.

(10) Patent No.: US 11,290,025 B2
(45) Date of Patent: Mar. 29, 2022

(54) POWER CONVERTER

(71) Applicant: DENSO CORPORATION, Aichi (JP)

(72) Inventors: Shinsuke Aoyagi, Isehara (JP); Shuichi Iwata, Nisshin (JP); Naoyuki Kishimoto, Susono (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/067,077

(22) Filed: Oct. 9, 2020

(65) Prior Publication Data

US 2021/0143746 A1  May 13, 2021

(30) Foreign Application Priority Data

Nov. 8, 2019 (JP) .............................. JP2019-203394

(51) Int. Cl.
*H02M 7/537* (2006.01)
*H02M 7/00* (2006.01)
*H02M 1/12* (2006.01)

(52) U.S. Cl.
CPC ............. *H02M 7/003* (2013.01); *H02M 1/12* (2013.01); *H02M 7/537* (2013.01)

(58) Field of Classification Search
CPC ........ H02M 1/12; H02M 7/003; H02M 7/537; H02M 3/003
See application file for complete search history.

(56) References Cited

U.S. PATENT DOCUMENTS 9,107,318 B2* 8/2015 Hida .................. H05K 7/20927
2017/0063218 A1* 3/2017 Nishizawa .............. H02M 1/14

FOREIGN PATENT DOCUMENTS

JP 2014-121121 A 6/2014

* cited by examiner

*Primary Examiner* — Gary L Laxton
(74) *Attorney, Agent, or Firm* — Oliff PLC

(57) ABSTRACT

Positive and negative power terminals protrude from a power terminal arrangement surface not facing a capacitor element. Positive and negative electrode bus bars gather with each other after at least one of them extends along a non-electrode surface of the capacitor element, and then run side by side in a bus bar parallel running section. The positive electrode bus bar runs in parallel with the negative electrode bus bar in the bus bar parallel running section, and then extends along the positive power terminal from the proximal end of the positive power terminal to the distal end thereof. The negative electrode bus bar runs in parallel with the positive electrode bus bar in the bus bar parallel running section, and then extends along the negative power terminal from the proximal end of the negative power terminal to the distal end thereof.

14 Claims, 12 Drawing Sheets

First Embodiment

First Embodiment

First Comparative Example

Second Comparative Example

First Comparative Example

Second Comparative Example

Second Embodiment

Third Embodiment

Fourth Embodiment

Modification Example

Fifth Embodiment

Prior Art Structure

POWER CONVERTER

CROSS-REFERENCE TO RELATED APPLICATION

The present disclosure claims priority under 35 U.S.C. § 119 to Japanese Patent Application No. 2019-203394, filed on Nov. 8, 2019. The content of which is incorporated herein by reference in its entirety.

BACKGROUND

Technical Field

The present disclosure relates to a power converter.

Background Art

For example, JP 2014-121121 A discloses a power converter including a power semiconductor module, and a capacitor element connected to the power semiconductor module via a DC-side bus bar.

SUMMARY

FIG. 15 is a schematic diagram showing the structure (prior art) of a power converter disclosed in JP 2014-121121 A in a simplified manner. In the structure shown in FIG. 15, a positive power terminal and a negative power terminal of a power semiconductor module is disposed on a module surface located on the side facing a capacitor element. Also, these power terminals are connected to the capacitor element via a positive electrode bus bar and a negative electrode bus bar, respectively. In the structure shown in FIG. 15, there is a single running section in which each of the positive electrode bus bar and the negative electrode bus bar extends independently. There is a concerned that, when this kind of single running section is long, the loop inductance of the electric current path between the power semiconductor module and the capacitor element may increase.

In the structure shown in FIG. 15, in order to shorten the single running section, it is required to shorten as much as possible the distance between the power semiconductor module and the capacitor element. However, the shortening of the distance is limited. Furthermore, seeking a shortening of the distance in order to shorten the single running section may lead to a decrease in the degree of freedom in selecting the positional relationship between the power semiconductor module and the capacitor element in a case of the power converter.

The present disclosure has been made in view of the problem described above, and an object of the present disclosure is to achieve the arrangement of a positive electrode bus bar and a negative electrode bus bar in a power converter, which can reduce the loop inductance of the electric current path between a power semiconductor module and a capacitor element while shortening a single running section without reducing the degree of freedom in selecting the positional relationship between the power semiconductor module and the capacitor element.

A power converter according to the present disclosure includes a capacitor element, a power semiconductor module, a positive electrode bus bar and a negative electrode bus bar. The capacitor element is configured to smooth a DC voltage supplied from a battery. The power semiconductor module includes a semiconductor switching element, a positive power terminal and a negative power terminal, and converts DC power from the capacitor element into AC power. The positive electrode bus bar and the negative electrode bus bar are formed to transfer DC power between the capacitor element and the power semiconductor module. The power semiconductor module includes a power terminal arrangement surface being a surface that does not face the capacitor element. The positive power terminal and the negative power terminal are arranged so as to protrude from the power terminal arrangement surface. The positive electrode bus bar and the negative electrode bus bar gather with each other after at least one of the positive electrode bus bar and the negative electrode bus bar extends along a non-electrode surface of the capacitor element, and then run side by side in a bus bar parallel running section. The positive electrode bus bar runs in parallel with the negative electrode bus bar in the bus bar parallel running section, and then extends along the positive power terminal from the proximal end of the positive power terminal to the distal end of the positive power terminal. The negative electrode bus bar runs in parallel with the positive electrode bus bar in the bus bar parallel running section, and then extends along the negative power terminal from the proximal end of the negative power terminal to the distal end of the negative power terminal.

The positive electrode bus bar may be in contact with the negative electrode bus bar via a first insulator in the bus bar parallel running section.

At least one of the positive electrode bus bar and the negative electrode bus bar may be in contact with the non-electrode surface of the capacitor element via a second insulator.

The power semiconductor module may be formed in a substantially rectangular parallelepiped shape and include a capacitor facing surface being a surface that faces the capacitor element. The power terminal arrangement surface may be located on the side opposite to the capacitor facing surface. The bus bar parallel running section may include a module parallel running section that runs along a first module surface. The first module surface may be one of widest surfaces of the power semiconductor module and be located between the capacitor facing surface and the power terminal arrangement surface. The power semiconductor module may be formed such that the length of a side connecting the first module surface with a module surface located on the side opposite to the first module surface becomes shorter than the length of each of sides forming the first module surface.

The power semiconductor module may be formed in a substantially rectangular parallelepiped shape and include a capacitor facing surface being a surface that faces the capacitor element. The power terminal arrangement surface may be one of surfaces adjacent to the capacitor facing surface. Either the positive electrode bus bar or the negative electrode bus bar may be located between the capacitor facing surface and a surface of the capacitor element that faces the capacitor facing surface.

The power converter may further include a cooler configured to cool the power semiconductor module. The cooler may include a first cooling section having a first module contact surface that is in contact with the capacitor facing surface. The first cooling section may be in contact with either the positive electrode bus bar or the negative electrode bus bar via a third insulator at a surface on the side opposite to the first module contact surface.

The power semiconductor module may include an AC power terminal. The power converter may further include: a cooler configured to cool the power semiconductor module; an AC bus bar connected to the AC power terminal; and a current sensor attached to the AC bus bar. The cooler may include a second cooling section having a second module contact surface that is in contact with a second module surface of the power semiconductor module located on the side opposite to the capacitor facing surface. The second cooler section may be in contact with the AC bus bar via a fourth insulator at a surface on the side opposite to the second module contact surface.

According to the power converter of the present disclosure, at least one of the positive electrode bus bar and the negative electrode bus bar extends along the non-electrode surface of the capacitor element and then gather with each other, and thereafter run side by side in the bus bar parallel running section. According to this kind of bus bar arrangement, it is easy to shorten the single section of each bus bar in the process of the positive and negative electrode bus bars from the capacitor element toward the positive and negative power terminals. Also, according to this kind of bus bar arrangement method, even if the distance of the power semiconductor module with respect to the non-electrode surface is long, the bus bar parallel running section becomes long but the single running section does not becomes long. Therefore, it is possible to shorten the single run section without limiting the degree of freedom of the positional relationship between the power semiconductor module and the capacitor element. Moreover, in the bus bar parallel running section, since the electric current flowing through the positive bus bar and the electric current flowing through the negative bus bar face each other, the magnetic flux generated by these electric currents is canceled out. As a result, the effect of canceling out the inductance of the positive and negative electrode bus bars can be obtained.

Moreover, according to the power converter of the present disclosure, the positive and negative power terminals are arranged so as to protrude from the power terminal arrangement surface which does not face the capacitor element. Also, the positive electrode bus bar runs in parallel with the negative electrode bus bar in the bus bar parallel running section, and then extends along the positive power terminal from the proximal end of the positive power terminal toward the distal end thereof. This also applies to the negative electrode bus bar. According to this kind of configuration, the effect of canceling out the inductance can be obtained between the positive power terminal and the positive electrode bus bar and also between the negative power terminal and the negative electrode bus bar.

As described above, the power converter of the present disclosure can achieve the arrangement of the positive electrode bus bar and the negative electrode bus bar, which can reduce the loop inductance of the electric current path between the power semiconductor module and the capacitor element while shortening a single running section without reducing the degree of freedom in selecting the positional relationship between the power semiconductor module and the capacitor element.

DETAILED DESCRIPTION

Figure 1:
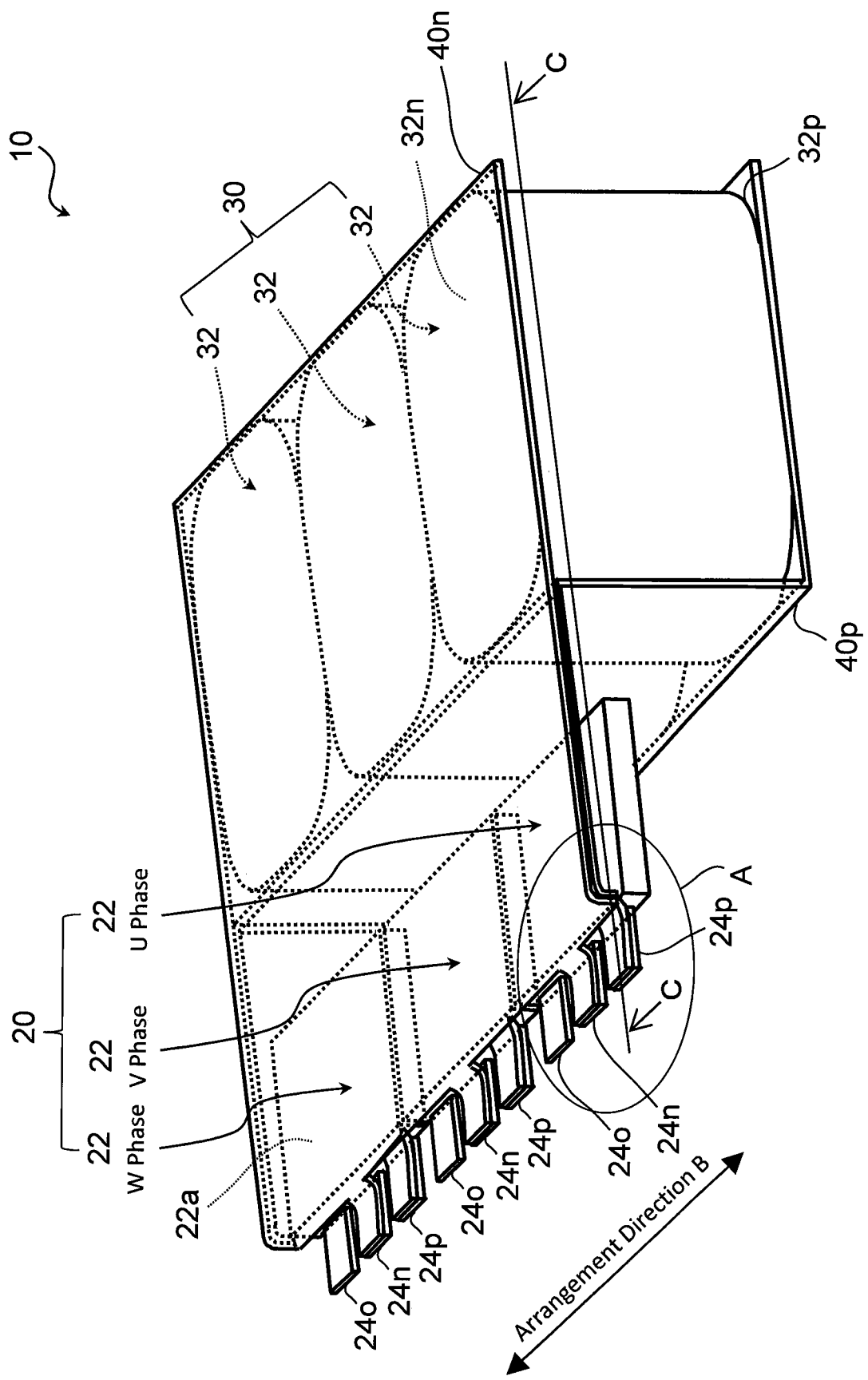
FIG. 1 is a perspective view showing a configuration of a main part of a power converter according to a first embodiment.

In the following embodiments which will be described below, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

1. First Embodiment

A first embodiment according to the present disclosure and modification examples thereof will be described with reference to FIGS. 1 to 6.

1-1. Configuration of Power Converter

Figure 2:
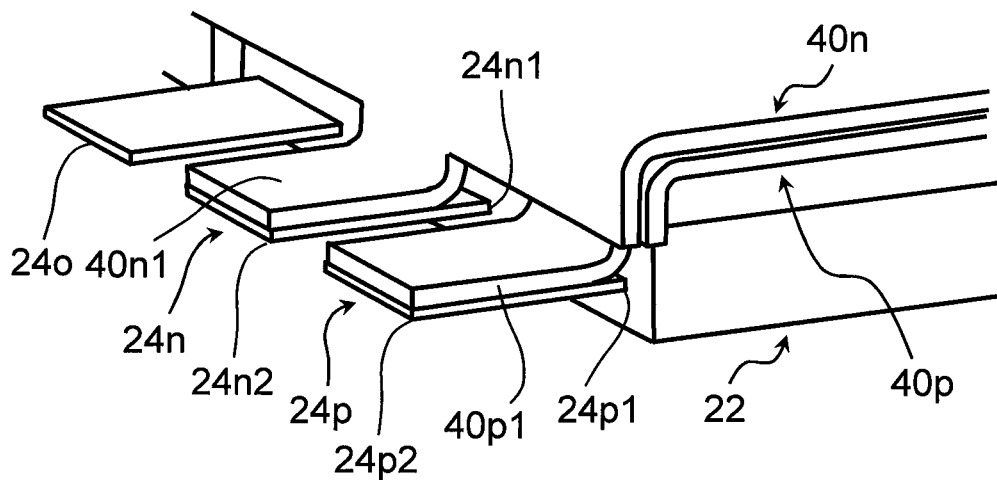
FIG. 2 is an enlarged view of a site A around power terminals in FIG. 1.

FIG. 1 is a perspective view showing a configuration of main part of a power converter 10 according to the first embodiment. FIG. 2 is an enlarged view of a site A around power terminals 24p, 24n and 24o in FIG. 1. As an example, the power converter 10 is mounted on an electrified vehicle provided with a drive source including a motor generator (not shown).

The power converter 10 is provide with a power semiconductor unit 20, a capacitor unit 30, a positive electrode bus bar (also referred to as a "P bus bar") 40p and a negative electrode bus bar (also referred to as a "N bus bar") 40n. The P bus bar 40p and the N bus bar 40n each connects the power semiconductor unit 20 with the capacitor unit 30. These bus bars 40p and 40n are made of, for example, a conductive metal.

The power semiconductor unit 20 has a function of converting DC (direct current) power supplied from a battery (DC power supply) (not shown) into AC (alternate current) power, and a function of converting AC power into DC power when the above described motor generator generates the AC power. As an example, the AC power controlled by the power semiconductor unit 20 is three-phase AC power of U phase, V phase and W phase. In the example shown in FIG. 1, the power semiconductor unit 20 includes a power semiconductor module (hereinafter, simply referred to as a "power module") 22 for each phase.

As an example, each power module 22 is formed in a substantially rectangular parallelepiped shape as shown in FIG. 1. More specifically, the power module 22 is configured as a flat plate-shaped power card in which a plurality of semiconductor switching elements (not shown) for power control are resin-molded. Moreover, in the example shown in FIG. 1, in order to reduce the height in the vertical direction of a reference plane 12 (see FIG. 3 described below), three power modules 22 are arranged side by side in one direction (referred to as an "arrangement direction B") while making the widest surface (upper surface 22a) of each power module 22 parallel to the reference plane 12. The reference plane 12 mentioned here corresponds to a bottom surface of a case of the power converter 10 for housing components, such as the power semiconductor unit 20 and the capacitor unit 30.

Each of the power modules 22 includes three power terminals 24p, 24n and 24o. The power terminals 24p and 24n are respectively a positive power terminal and a negative power terminal to which a DC voltage is applied. The power terminal 24o is an AC power terminal that outputs AC power. Each of the power terminals 24p, 24n and 24o is formed in a plate shape as an example.

The capacitor unit 30 includes three capacitor elements 32 as an example. These three capacitor elements 32 are connected in parallel using a P bus bar 40p and an N bus bar 40n. Moreover, each of the capacitor elements 32 (capacitor unit 30) is connected to the above described battery via the P bus bar 40p and N bus 40n and connectors (not shown), and smooths the DC voltage supplied from the battery.

The capacitor element 32 is a film capacitor, for example. Both end surfaces of the capacitor element 32 functions as a pair of electrode surfaces, that is, an electrode surface 32p on the positive electrode side and an electrode surface 32n on the negative electrode side. As an example, the capacitor element 32 has a substantially rectangular parallelepiped shape as shown in FIG. 1. In more detail, the capacitor element 32 has a rectangular cross section with four rounded corners as a cross section in a direction parallel to the electrode surfaces 32p and 32n. In addition, in the example shown in FIG. 1, in order to reduce the height of the reference plane 12 (see FIG. 3) in the vertical direction, the capacitor unit 30 is arranged side by side in a row in the arrangement direction B while making the electrode surface 32p on the positive electrode side of each capacitor element 32 parallel to the reference plane 12.

The P bus bar 40p and the N bus bar 40n transfers the DC power between the capacitor elements 32 (capacitor unit 30) and the power modules 22 (power semiconductor unit 20). More specifically, when the electrified vehicle is driven by the motor generator (i.e., during power running), the DC power of the battery described above is smoothed by the capacitor elements 32 (capacitor unit 30) and is then supplied to the power modules 22 (power semiconductor unit 20). At this time, the electric current flows toward the power terminals 24p from the electrode surface 32p of each capacitor element 32 via the P bus bar 40p. The power modules 22 generate an AC power from the supplied DC power and supplies the AC power to the motor generator.

On the other hand, during regenerative braking of the electrified vehicle, the power modules 22 convert the AC power generated by the motor generator into DC power, and supplies the DC power to the battery via the capacitor elements 32 (i.e., charges the battery). At this time, the electric current flows toward the electrode surfaces 32p from the power terminals 24p via the P bus bar 40p.

As shown in FIG. 2, end portions 40p1 of the P bus bar 40p on the power module 22 side are fixed to the power terminals 24p by, for example, welding. Similarly, end portions 40n1 of the N bus bar 40n are fixed to the power terminals 24n by, for example, welding. Furthermore, an AC bus bar (not shown) is fixed, by, for example, welding, to the AC power terminals 24o on the output side for supplying the AC power to the motor generator.

1-1-1. Arrangement of P Bus Bar and N Bus Bar

Figure 3:
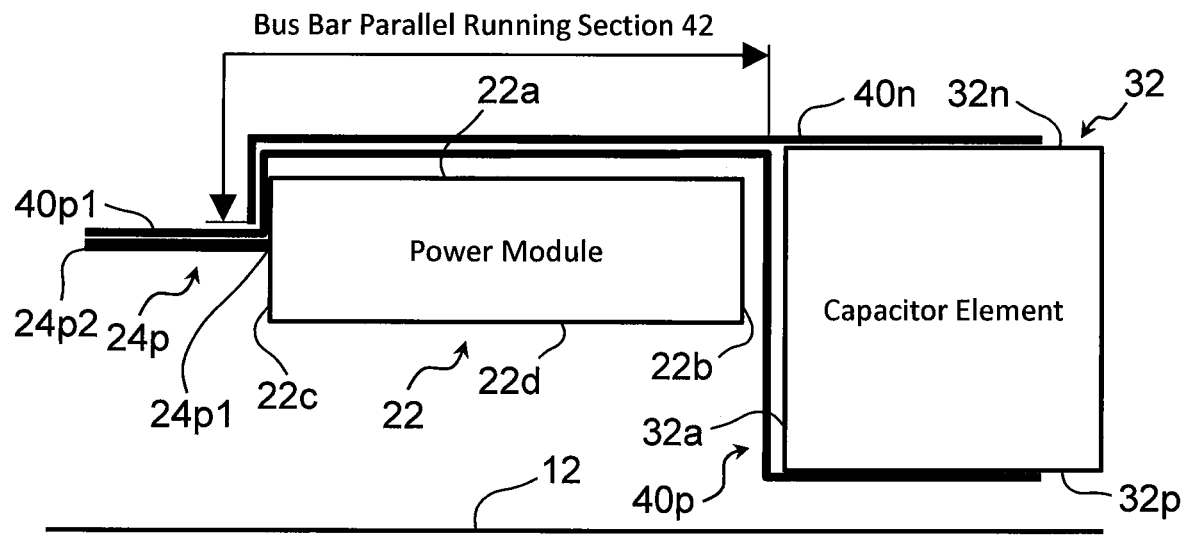
FIG. 3 is a diagram schematically showing a cross section taken along a C-C line in FIG. 1.

FIG. 3 is a diagram schematically showing a cross section taken along a C-C line in FIG. 1 (a cross section at a position of the positive power terminal 24p when viewed in the arrangement direction B). The power module 22 includes a module surface 22b facing the capacitor element 32, and a module surface 22c located on the side opposite to the module surface 22b (in other words, located on the side far from the capacitor element 32). The power terminal 24p and the power terminal 24n (see FIG. 2) are respectively arranged so as to protrude from the module surface 22c. It should be noted that the module surfaces 22b and 22c respectively correspond to an example of the "capacitor facing surface" and "power terminal arrangement surface" according to the present disclosure.

As shown in FIG. 3, the N bus bar 40n extends along the electrode surface 32n while being in contact with the electrode surface 32n, and then extends linearly along the power module 22 toward the terminal 24n on the side of the module surface (upper surface) 22a.

On the other hand, the P bus bar 40p is bent after extending along the electrode surface 32p while being in contact with the electrode surface 32p located at an end on the side opposite to the electrode surface 32n, and then extends along a non-electrode surface 32a of the capacitor element 32 toward the N bus bar 40n. More specifically, the p bus bar 40p extends along the non-electrode surface 32a at a position as close as possible to the non-electrode surface 32a while ensuring insulation with the capacitor element 32. The non-electrode surface 32a faces the module surface 22b. Moreover, the P bus bar 40p gathers with the N bus bar 40n, and then runs in parallel with the N bus bar 40n in a bus bar parallel running section 42.

To be more specific, the bus bar parallel running section 42 includes a "module parallel running section" in which the P bus bar 40p and the N bus bar 40n run parallel along the module surface 22a. Moreover, in the example shown in FIG. 3, the bus bar parallel running section 42 includes not only the module parallel running section but also a section in which the bus bars 40p and 40n extend along the module surface (power terminal arrangement surface) 22c to the vicinity of the power terminals 24p and 24n. It should be noted that, in the example shown in FIG. 3, this module surface 22a is one of the widest surfaces of the power module 22 and is located between the module surface (capacitor facing surface) 22b and the module surface (power terminal arrangement surface) 22c. Therefore, this corresponds to an example of the "first module surface" according to the present disclosure. In addition, the power module 22 is formed such that the length of the side connecting the first module surface (module surface 22a) with the module surface located on the opposite side (module surface 22d) becomes shorter than the length of each of the sides forming the first module surface.

The P bus bar 40p runs in parallel with the N bus bar 40n in the bus bar parallel running section 42 and then extends along the power terminal 24p from the proximal end 24p1 of the power terminal 24p toward the distal end 24p2 thereof. Similarly, the N bus bar 40n runs in parallel with the P bus bar 40p in the bus bar parallel running section 42 and then extends along the power terminal 24n from the proximal end 24n1 of the power terminal 24n (refer to FIG. 2) toward the distal end 24n2 thereof.

1-2. Effect

Figure 4A:
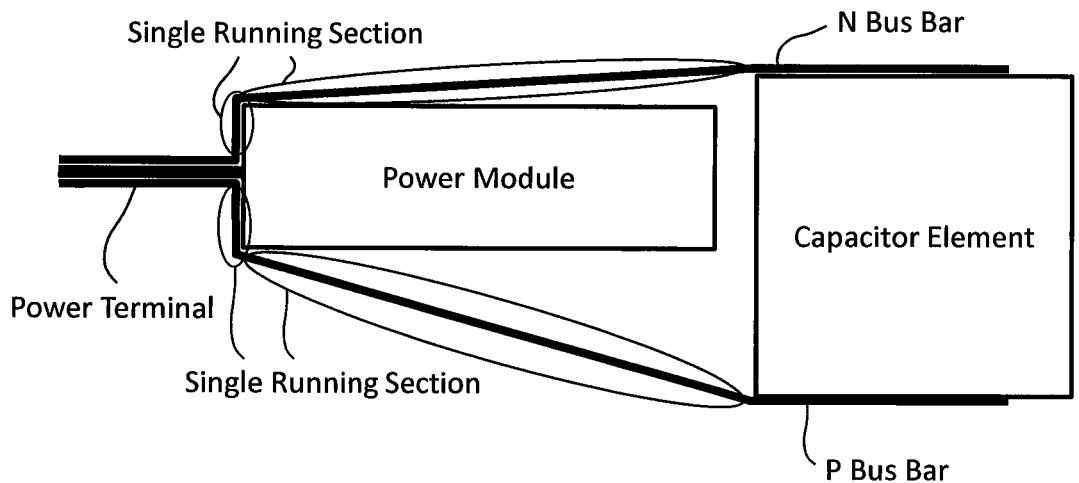
FIG. 4A is a schematic diagram showing a bus bar arrangement according to a first comparative example with respect to the first embodiment.
Figure 4B:
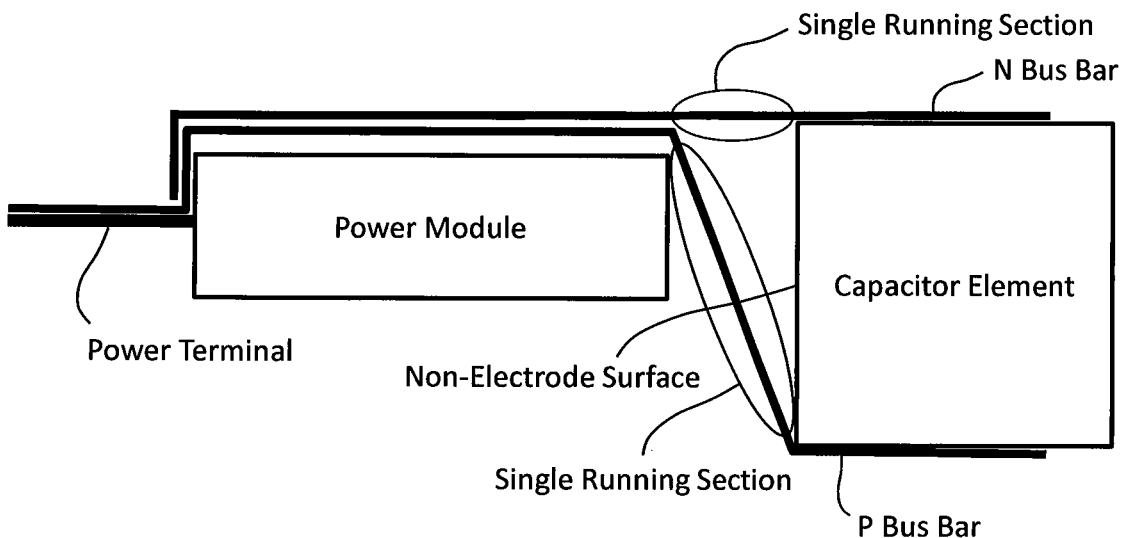
FIG. 4B is a schematic diagram showing a bus bar arrangement according to a second comparative example with respect to the first embodiment.

FIGS. 4A and 4B are schematic diagrams showing bus bar arrangements according to a first comparative example and a second comparative example with respect to the first embodiment, respectively. The effect of the bath bar arrangement according to the first embodiment will be described in comparison with these first and second comparative examples.

In the first comparative example, as shown in FIG. 4A, a P bus bar and an N bus bar do not gather with each other and run in parallel, but each independently extends toward a power terminal. According to this first comparative example, although the lengths of the P bus bar and the N bus bar of a section from a capacitor element to the power terminal can be shortened, many single running sections are generated. Moreover, in a second comparative example, a P bus bar and an N bus bar gather before reaching a power module, and then run in parallel. Because of this, as compared to the first comparative example, a configuration that makes it easier to shorten the single running section can be obtained, but the P bus bar does not extend along a non-electrode surface of a capacitor element. As a result, even in the second comparative example, the single running section cannot be shortened sufficiently.

(Shortening of Single Running Section)

On the other hand, according to the power converter 10 of the present embodiment, the P bus bar 40p gathers with the N bus bar 40n after extending along the non-electrode surface 32a of the capacitor element 32 toward the N bus bar 40n, and thereafter runs in parallel with the N bus bar 40n in the bus bar parallel running section 42. According to this kind of bus bar arrangement, in the process in which the bus bars 40p and 40n move from the capacitor element 32 toward the power terminals 24p and 24n, the single running section of each of the bus bars 40p and 40n can be effectively shortened as compared to the first and second comparative examples. Also, according to this kind of bus bar arrangement method, even if the distance between the module surface 22b of the power module 22 and the non-electrode surface 32a of the capacitor element 32 is made longer than that in the example shown in FIG. 3, the bus bars 40p and 40n (more specifically, the bus bar parallel running section thereof) will be longer but the single running sections thereof will not be longer. Therefore, it is possible to shorten the single running sections without restricting the degree of freedom of the positional relationship between the power module 22 and the capacitor element 32.

It should be noted that, in the configuration shown in FIG. 3, the portion where the P bus bar 40p extends along the non-electrode surface 32a is a single running section, but the direction of the electric current flowing through this portion of the P bus bar 40p is opposite to the direction of the electric current inside the capacitor element 32. Therefore, the magnetic flux generated by these electric currents is canceled. As a result, in the portion described above, the effect of canceling out the inductance is obtained between the P bus bar 40p and the capacitor element 32. This effect can also be similarly obtained when the bus bar arrangement is adopted in which the arrangement of the P bus bar 40p and the N bus bar 40n in the example shown in FIG. 3 is reversed and the N bus bar 40n gathers with the P bus bar 40p after extending along the non-electrode surface 32a.

(Reduction of Loop Inductance)

Moreover, according to the bus bar arrangement of the present embodiment, the effect of canceling out the inductance can be obtained at the bus bar parallel running section 42 shown in FIG. 3 and at the connection portion between the power terminals 24p and 24n and the bus bars 40p and 40n. As a result, it is possible to reduce the loop inductance between the power module 22 and the capacitor element 32. More specifically, the loop inductance mentioned here corresponds to the loop inductance of the electric current path formed so as to pass from the semiconductor switching elements in the power module 22 through the power terminals 24n, the N bus bar 40n, the capacitor element 32, the P bus bar 40p and the power terminal 24p in order and to then return to the semiconductor switching elements again.

Specifically, in the bus bar parallel running section 42, since the electric current flowing through the P bus bar 40p and the electric current flowing through the N bus bar 40n face each other, the magnetic flux generated by these electric currents are canceled out. Thus, the effect of canceling out the inductance can be obtained between the P bus bar 40p and the N bus bar 40n.

Furthermore, according to the present embodiment, the power terminals 24p and 24n are arranged so as to protrude from the module surface 22c on the side opposite to the module surface (capacitor facing surface) 22b that faces the non-electrode surface 32a. On that basis, the P bus bar 40p runs in parallel with the N bus bar 40n in the bus bar parallel running section and then extends along the power terminal 24p from the proximal end 24p1 of the power terminal 24p toward the distal end 24p2 thereof. This also applies to the N bus bar 40n. According to this kind of configuration, as will now be described with reference to FIG. 5, the effect of canceling out the inductance can be obtained at the connection portion between the power terminals 24p and 24n and the bus bars 40p and 40n.

Figure 5:
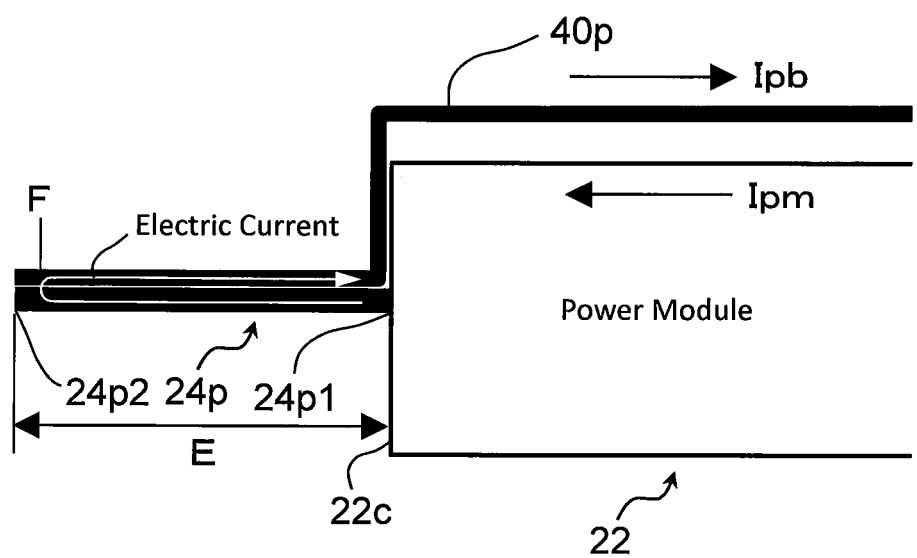
FIG. 5 is a schematic diagram used to describe an effect of a manner of connecting a positive power terminal and a P bus bar according to the first embodiment.

FIG. 5 is a schematic diagram used to describe the effect of the manner of connecting the positive power terminal 24p and the P bus bar 40p according to the first embodiment. In an example in which the P bus bar 40p is arranged along the power terminal 24*p*, if the power terminal 24*p* and the P bus bar 40*p* are in uniform contact with each other in an entire range E shown in FIG. 5, the electric current between the power terminal 24*p* and the P bus bar 40*p* will flow in the shortest distance (i.e., at the position of the base end 24*p*1). However, the surface pressure of the power terminal 24*p*, which is connected to the P bus bar 40*p* by, for example, welding, is not always uniform and may varies depending on the site. If there is this kind of variation, the electric current will flow between the two at a position where the electric current easily flows.

The electric current path shown in FIG. 5 shows an example in which the electric current flows through a position F when the electric current flows from the power module 22 to the P bus bar 40*p* (i.e., during the regenerative braking). Even when the electric current flows through the position F relatively far from the proximal end 24*p*1 in this way, the electric current flowing through the power terminal 24*p* and the electric current flowing through the P bus bar 40*p* face each other as shown in FIG. 5. Because of this, due to the same reason as the bus bar parallel running section described above, the effect of canceling out the inductance between the power terminal 24*p* and the P bus bar 40*p* in the vicinity of the power terminal 24*p* can be obtained. This also applies to the time of the power running.

Furthermore, the P bus bar 40*p* extends from the proximal end 24*p*1 toward the distal end 24*p*2, not from a position between the proximal end 24*p*1 and the distal end 24*p*2. Thus, when the electric current flows in the electric current path as shown in FIG. 5, it is possible to maximize the effect of canceling out the inductance.

Figure 15:
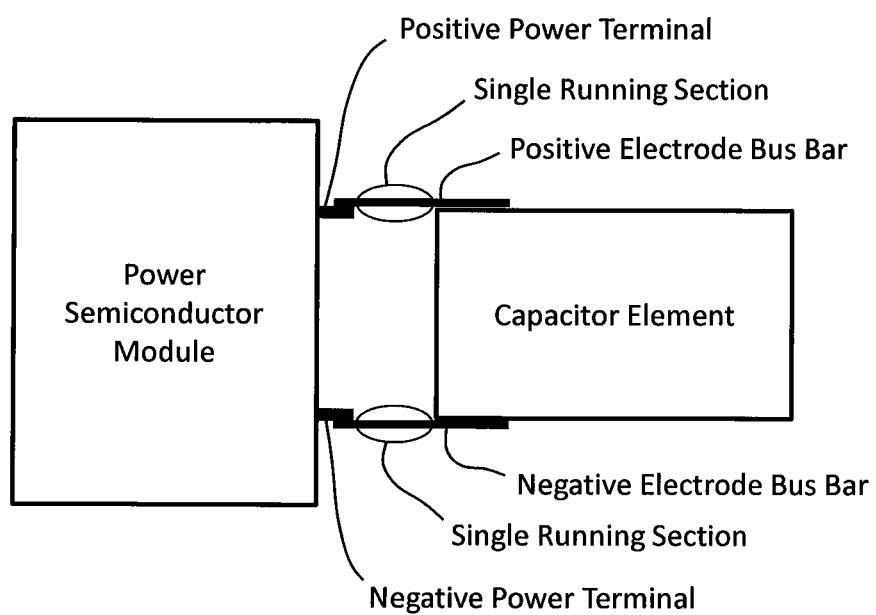
FIG. 15 is a schematic diagram showing the structure (prior art) of a power converter disclosed in JP 2014-121121 A in a simplified manner.

The effect described above with reference to FIG. 5 can be similarly obtained in the relationship between the power terminal 24*n* and the N bus bar 40*n*. In addition, unlike the present embodiment, it is conceivable to adopt an arrangement in which the power terminal 24*p* protrudes from the capacitor facing surface 22*b* in a manner similar to the structural example shown in FIG. 15 (prior art). However, in order to place a P bus bar from the proximal end 24*p*1 toward the distal end 24*p*2 when this kind of arrangement is adopted, it is necessary to once extend the P bus bar toward the power terminal 24*p* from the capacitor element 32 side, and then extend the P bus bar again toward the capacitor element 32. As a result, the shape of the P bus bar becomes complicated. In contrast to this, according to the bus bar arrangement of the present embodiment, by adopting the arrangement in which the power terminal 24*p* protrudes from the module surface 22*c* (i.e., the surface on the side opposite to the capacitor facing surface 22*b*), the P bus bar 40*p* can be arranged so as to extend from the proximal end 24*p*1 toward the distal end 24*p*2 while avoiding this kind of complication of the P bus bar shape. This also applies to the N bus bar 40*n*.

(Summary)

As described so far, the bus bar arrangement according to the present embodiment can reduce the loop inductance of the electric current path between the power module 22 and the capacitor element 32 while shortening the single running sections without reducing the degree of freedom in selecting the positional relationship between the power module 22 and the capacitor element 32 in the case of the power converter 10.

(Module Parallel Running Section)

Additionally, in the example shown in FIG. 3, the bus bar parallel running section 42 includes the "module parallel running section" in which the P bus bar 40*p* and the N bus bar 40*n* run side by side along the module surface 22*a*. A symbol "Ipm" in FIG. 5 is used to indicate the direction of the electric current (corresponding to part of the electric current in the power module 22) flowing toward the power terminal 24*p* in the power module 22 during the regenerative braking. As shown in FIG. 5, the direction of this electric current Ipm is opposite to the direction of an electric current Ipb flowing through the P bus bar 40*p* in the module parallel running section. Thus, the effect of canceling out the inductance between the power module 22 and the P bus bar 40*p* can be obtained in the module parallel running section. This effect also leads to the reduction of the loop inductance described above. Furthermore, this kind of effect can be obtained similarly between the N bus bar 40*n* and the power module 22 in the module parallel running section because the direction of the electric current flowing from the power terminal 24*n* into the power module 22 is opposite to the direction of the electric current flowing through the N bus bar 40*n*. Also, the effect described here can be obtained similarly at the time of the power running.

1-3. Modification Examples

In the first embodiment described above, as shown in FIG. 3, the P bus bar 40*p* extends along the non-electrode surface 32*a* of the capacitor element 32, and then gathers with the N bus bar 40*n*. However, the bus bar arrangement may alternatively be adopted in which the arrangement of the P bus bar 40*p* and the N bus bar 40*n* in the example shown in FIG. 3 is reversed, and the N bus bar 40*n* extends along the non-electrode surface 32*a* and then gathers with the P bus bar 40*p*. In addition, in each embodiment and each modification example described below, the arrangement of a P bus bar and an N bus bar may be similarly reversed.

Figure 6A:
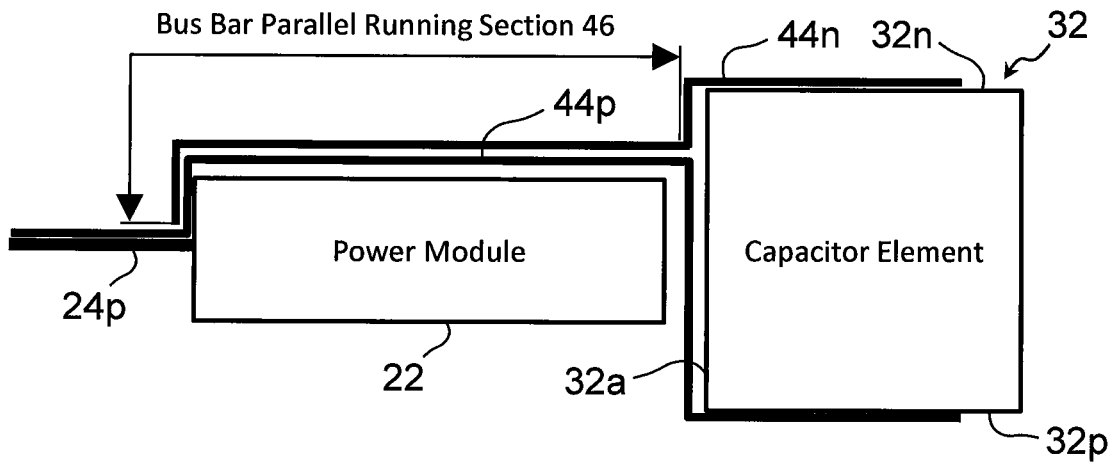
FIG. 6A is a schematic diagram showing a bus bar arrangement according to a first modification example with respect to the first embodiment.
Figure 6B:
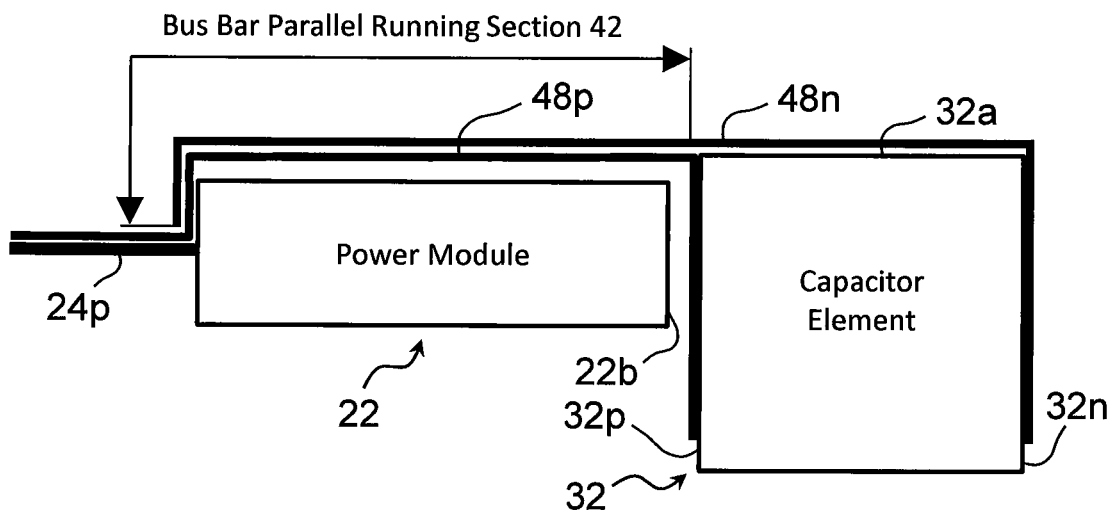
FIG. 6B is a schematic diagram showing a bus bar arrangement according to a second modification example with respect to the first embodiment.

FIGS. 6A and 6B are schematic diagrams showing the bus bar arrangement according to a first modification example and a second modification example with respect to the first embodiment, respectively. The first and second modification examples are different from the example shown in FIG. 3 in the following points.

In the first modification example, as shown in FIG. 6A, both a P bus bar 44*p* and an N bus bar 44*n* extend so as to approach each other along the non-electrode surface 32*a* of the capacitor element 32, and then gather with each other, and thereafter run side by side in a bus bar parallel running section 46. Even with this kind of configuration, the similar effect to that of the first embodiment can be obtained. In addition, when both the P bus bar 44*p* and the N bus bar 44*n* are arranged to extend along the non-electrode surface 32*a* of the capacitor element 32 as in the first modification example, the effect of canceling out the inductance with the capacitor element 32 can be obtained in both the P bus bar 40*p* and the N bus bar 40*n*.

In the second modification example, as shown in FIG. 6B, the orientation of the capacitor element 32 is different from that in the example shown in FIG. 3, and the electrode surface 32*p*, not the non-electrode surface 32*a*, faces the module surface 22*b* of the power module 22. On that basis, in the second modification example, an N bus bar 48*n* extends along the non-electrode surface 32*a* and then gathers with the P bus bar 48*p*, and thereafter runs side by side in the bus bar parallel running section 42. Even with this kind of configuration, the similar effect to that of the first embodiment can be obtained.

It should be noted that the end portion 40*p*1 of the P bus bar 40*p* shown in FIG. 3 is formed so as to extend from the proximal end 24*p*1 of the power terminal 24*p* to the position of the distal end 24*p*2 thereof. However, the "positive electrode bus bar" according to the present disclosure may not always extend to the distal position (i.e., the tip) of a positive power terminal, as long as it extends along the positive power terminal from the proximal end thereof toward the tip thereof. This also applies to the "negative electrode bus bar" according to the present disclosure.

Furthermore, the first embodiment described above has exemplified the configuration in which the power semiconductor unit 20 including a plurality of (e.g., three) power modules 22, and the capacitor unit 30 including a plurality of (e.g., three) capacitor elements 32 are connected via the P bus bar 40p and the N bus bar 40n. However, the power converter according to the present disclosure may include a configuration in which one or more power semiconductor modules and one or more capacitor elements, which are different in number from the examples described above, are connected via a positive electrode bus bar and a negative electrode bus bar.

2. Second Embodiment

Figure 7:
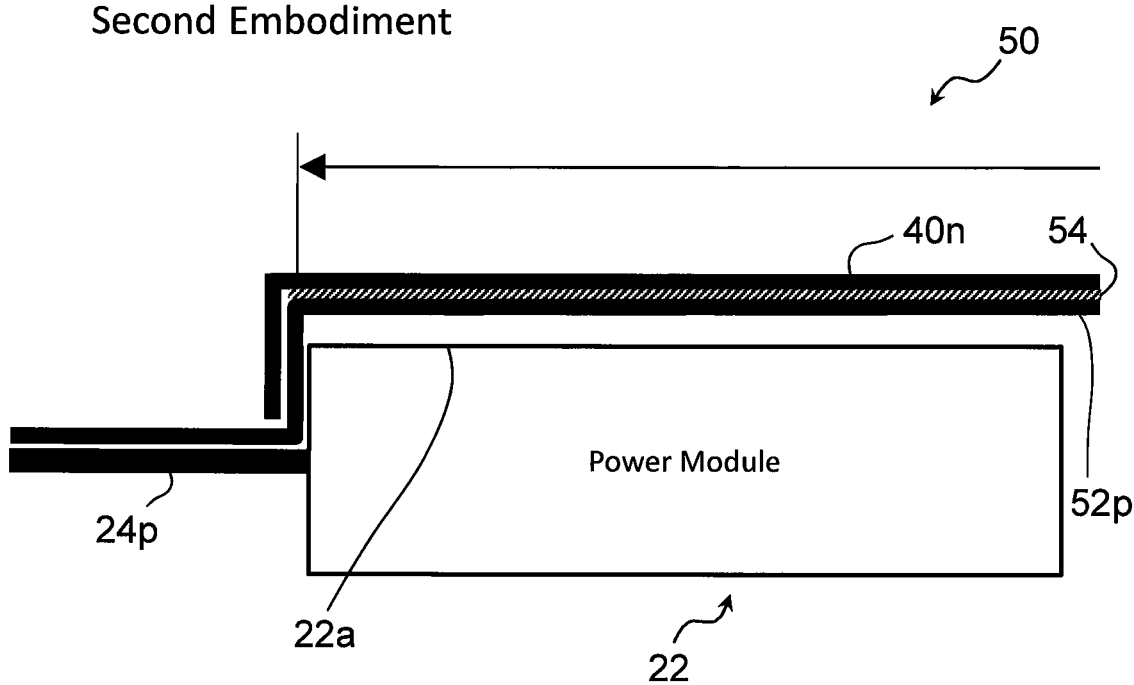
FIG. 7 is a schematic diagram showing a feature of a power converter according to a second embodiment.

Then, a second embodiment according to the present disclosure will be described with reference to FIG. 7. FIG. 7 is a schematic diagram showing a feature of a power converter 50 according to the second embodiment. This power converter 50 is different from the power converter 10 according to the first embodiment in the following point.

Specifically, FIG. 7 shows a P bus bar 52p and an N bus bar 40n in the bus bar parallel running section 42. In the bus bar parallel running section 42 according to the present embodiment, the P bus bar 52p is in contact (more specifically, is in close contact) with the N bus bar 40n via an insulator 54. An example of the insulator 54 is electrically insulating paper. The insulator 54 corresponds to an example of the "first insulator" according to the present disclosure.

According to the configuration of the second embodiment described above, by minimizing the distance (clearance) between the P bus bar 52p and the N bus bar 40n in the bus bar parallel running section 42, the effect of canceling out the magnetic flux due to the fact that the electric current flowing through the P bus bar 52p and the electric current flowing through the N bus bar 40n face each other can be maximized. As a result, the effect of canceling out the inductance of the bus bars 52p and 40n in the bus bar parallel running section 42 can be maximized, and the loop inductance between the power module 22 and thereby the capacitor element 32 can be effectively reduced.

3. Third Embodiment

Figure 8:
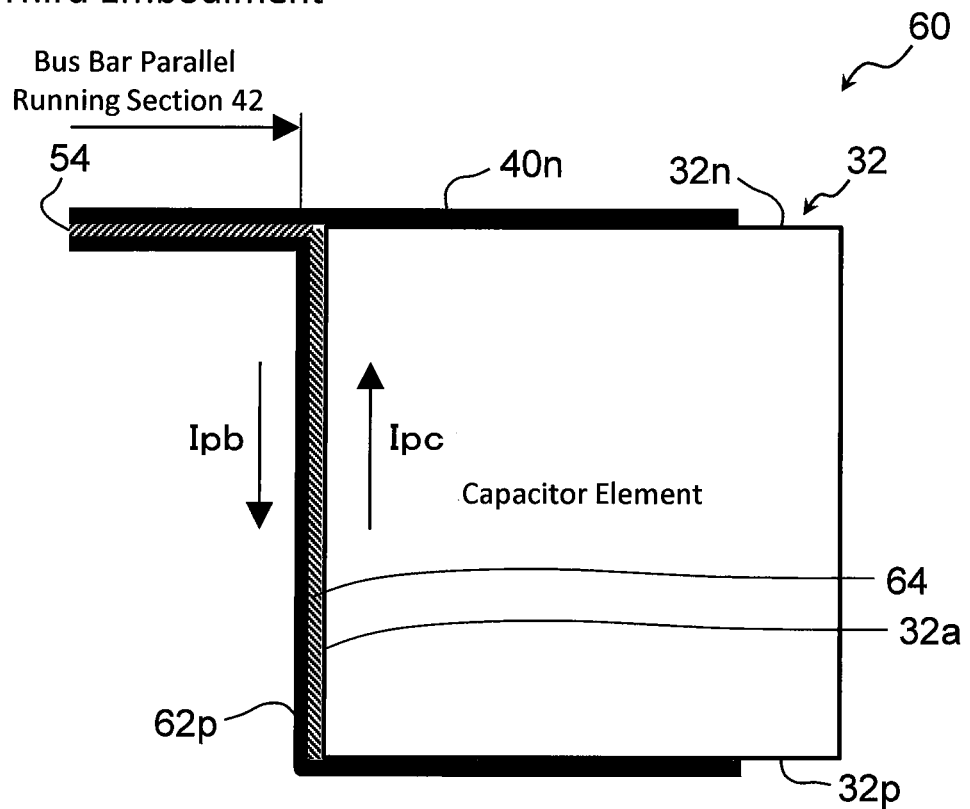
FIG. 8 is a schematic diagram showing a feature of a power converter according to a third embodiment.

Then, a third embodiment according to the present disclosure will be described with reference to FIG. 8. FIG. 8 is a schematic diagram showing a feature of a power converter 60 according to the third embodiment. The power converter 60 is different from the power converter 50 according to the second embodiment in the following points.

In the present embodiment, as shown in FIG. 8, a P bus bar 62p is in contact (more specifically, is in close contact) with the non-electrode surface 32a of the capacitor element 32 via an insulator 64. An example of the insulator 64 is also an electrically insulating paper. The insulator 64 corresponds to an example of the "second insulator" according to the present disclosure.

According to the configuration of the third embodiment described above, by minimizing the distance (clearance) between the P bus bar 62p and the non-electrode surface 32a, the effect of canceling out the magnetic flux due to the fact that the electric current Ipb flowing through the P bus bar 62p and the electric current Ic flowing through the capacitor element 32 face each other can be maximized. As a result, the effect of canceling out the inductance between the P bus bar 62p and the non-electrode surface 32a can be maximized, and thereby the loop inductance between the power module 22 and the capacitor element 32 can be effectively reduced.

In addition, the configuration according to the third embodiment may alternatively be combined with a bus bar arrangement in which both a P bus bar and an N bus bar extend along a non-electrode surface of a capacitor element as in the first modification example shown in FIG. 6. In detail, both the P bus bar and the N bus bar may be in contact with the non-electrode surface via the second insulator as described above. Furthermore, unlike the example shown in FIG. 8, the bus bar parallel running section 42 may not be provided with the insulator 54 similarly to the example shown in FIG. 3 (i.e., the configuration according to the third embodiment may be combined with that according to the first embodiment).

4. Fourth Embodiment

Then, a fourth embodiment according to the present disclosure and modification examples thereof will be described with reference to FIGS. 9 to 11.

4-1. Configuration of Power Converter

Figure 9:
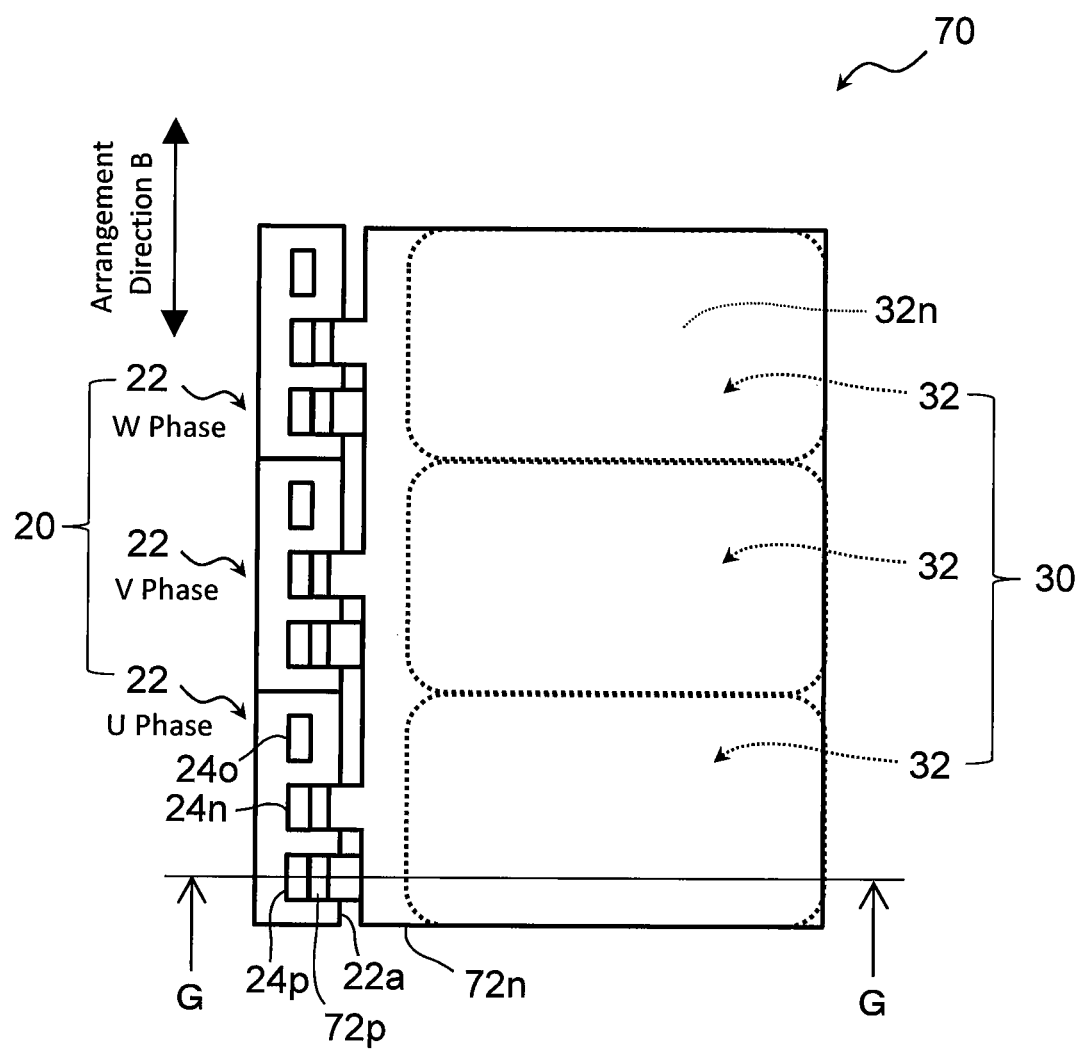
FIG. 9 is a plan view showing a configuration of a main part of a power converter according to a fourth embodiment.

FIG. 9 is a plan view showing the configuration of a main part of a power converter 70 according to the fourth embodiment (a view as seen from the side of the electrode surface 32n of the capacitor element 32). FIG. 10 is a diagram schematically showing a G-G line cross section in FIG. 9 (a cross section at the position of the positive power terminal 24p when viewed from the arrangement direction B). The power converter 70 is different from the power converter 10 according to the first embodiment in the following points.

Figure 10:
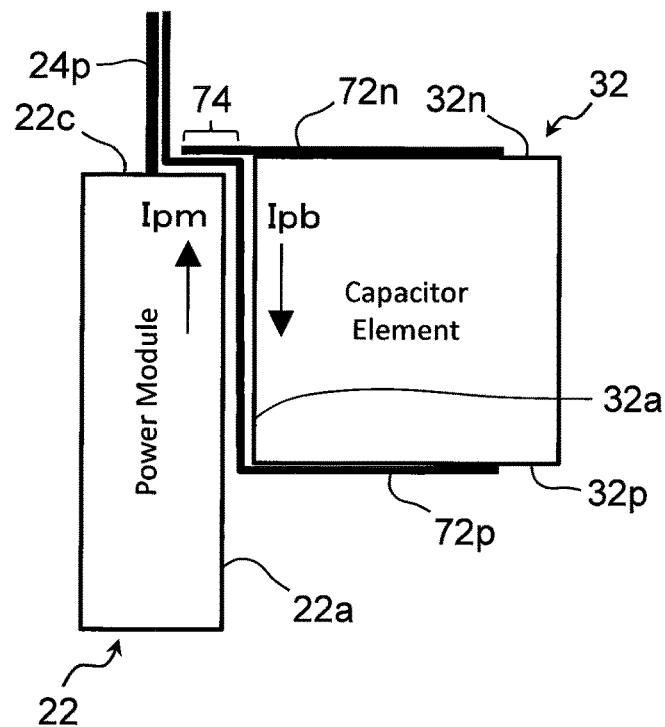
FIG. 10 is a diagram schematically showing a G-G line cross section in FIG. 9.

In the example of unit arrangement according to the present embodiment, as shown in FIGS. 9 and 10, the power semiconductor unit 20 and the capacitor unit 30 is arranged such that the module surface 22a of each power module 22 faces the non-electrode surface 32a of the capacitor element 32. Therefore, in this example of the unit arrangement, the module surface 22a corresponds to an example of the "capacitor facing surface" according to the present disclosure.

Moreover, in the present embodiment, the module surface 22c corresponding to the power terminal arrangement surface corresponds to one of the surfaces adjacent to the module surface (capacitor facing surface) 22a.

In the example shown in FIG. 10, the height of the electrode surface 32n on the negative electrode side is close to the height of the module surface (power terminal arrangement surface) 22c. Therefore, an N bus bar 72n extends along the electrode surface 32n, and then extends linearly toward the power module 22.

As shown in FIG. 10, similarly to the P bus bar 40p shown in FIG. 3, a P bus bar 72p extends along the electrode surface 32p and is then bent, and thereafter extends along the non-electrode surface 32a toward the N bus bar 72n. As a result, the P bus bar 72p is interposed between the module surface 22a and the non-electrode surface 32a that facing the module surface 22a. It should be noted that, in the example of the bus bar arrangement in which the N bus bar 72n extends along the non-electrode surface 32a contrary to the example shown in FIG. 10, the N bus bar 72n is interposed between the module surface 22a and the non-electrode surface 32a.

The bus bar arrangement of the present embodiment includes a bus bar parallel running section 74 similarly to the first embodiment. That is to say, the P bus bar 72p gathers with the N bus bar 72n, and then runs in parallel with the N bus bar 72n in the bus bar parallel running section 74. In more detail, in the example shown in FIG. 10, the bus bar parallel running section 74 extends along the power terminal arrangement surface 22c. The configuration of the bus bars 72p and 72n around the power terminals 24p and 24n after finishing the bus bar parallel running section 74 is the same as that of the first embodiment, and thus a description thereof will be omitted.

In addition, similarly to the second embodiment (see FIG. 7), the P bus bar 72p may be in contact (more specifically, may be in close contact) with the N bus bar 72n via the first insulator in the bus bar parallel running section 74. Furthermore, similarly to the third embodiment (see FIG. 8), the P bus bar 72p may be in contact (more specifically, may be in close contact) with the non-electrode surface 32a of the capacitor element 32 via the second insulator.

4-2. Effect

As described so far, according to the bus bar arrangement of the present embodiment which is based on the unit arrangement as shown in FIGS. 9 and 10, similarly to the first embodiment, the P bus bar 72p extends along the non-electrode surface 32a and then gathers with the N bus bar 72n, and thereafter runs in parallel with the N bus bar 72n in the bus bar parallel running section 74. Also, in the present embodiment, the power terminals 24p and 24n are disposed on the module surface 22c which does not face the capacitor element 32. Further, after the parallel running, the P bus bar 72p extends from the proximal end 24p1 to the distal end 24p2, and the N bus bar 72n extends from the proximal end 24n1 to the distal end 24n2. Thus, the loop inductance of the electric current path between the power module 22 and the capacitor element 32 can be reduced while shortening the single running sections without reducing the degree of freedom in selecting the positional relationship between the power module 22 and the capacitor element 32 in the case of the power converter 70.

Moreover, in the present embodiment, the power module 22 (power semiconductor unit 20) and the capacitor element 32 (capacitor unit 30) are arranged such that the P bus bar 72p is interposed between the module surface 22a and the non-electrode surface 32a. As a result, even in the example shown in FIG. 10, similarly to the example shown in FIG. 3, the electric current Ipm flowing toward the power terminal 24p in the power module 22 can be caused to face the electric current Ipb flowing through the P bus bar 72p. Thus, the effect of canceling out the inductance can be obtained between the power module 22 and the P bus bar 72p.

In addition, according to configuration shown in FIG. 10, the effect of canceling out the inductance can also be obtained between the P bus bar 72p and the capacitor element 32 similarly to the configuration shown in FIG. 3.

4-3. Modification Examples

Figure 11:
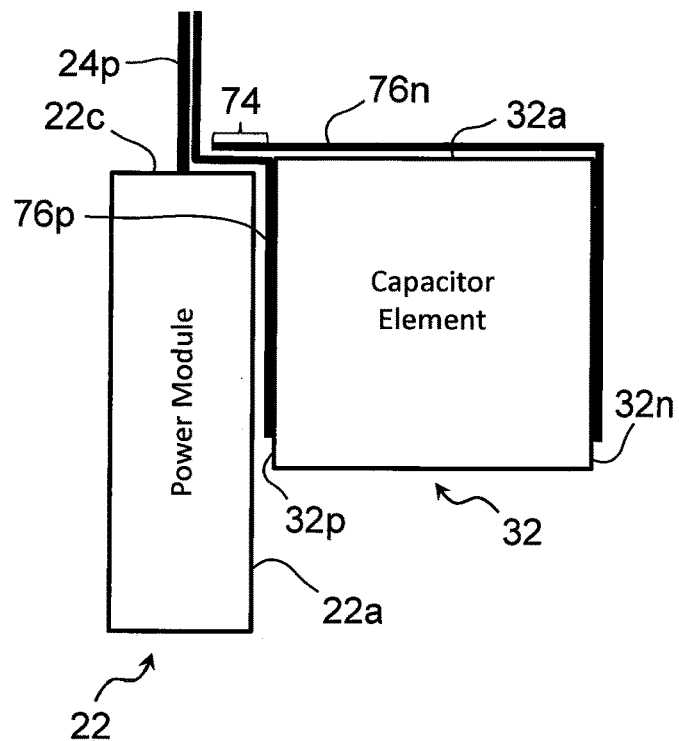
FIG. 11 is a schematic diagram showing a bus bar arrangement according to a modification example with respect to the fourth embodiment.

FIG. 11 is a schematic diagram showing a bus bar arrangement according to a modification example with respect to the fourth embodiment. In this modification example, as shown in FIG. 11, the orientation of the capacitor element 32 is different from that of the example shown in FIG. 10, and the electrode surface 32p, not the non-electrode surface 32a, faces the module surface (capacitor facing surface) 22a of the power module 22. On that basis, in the present modification example, an N bus bar 76n extends along the non-electrode surface 32a and then gathers with the P bus bar 76p, and thereafter runs side by side in the bus bar parallel running section 74.

Furthermore, the configuration shown in FIG. 10 may be modified as follows. That is to say, in another example in which the height (i.e., the position in the top-bottom direction of the drawing sheet in FIG. 10) of the power terminal arrangement surface 22c is lowered as compared to the example shown in FIG. 10, a configuration may be adopted such that, similar to the configuration shown in FIG. 6A, both the P bus bar 72p and the N bus bar 72n extend along the non-electrode surface 32a so as to approach each other and then gather with each other.

5. Fifth Embodiment

Figure 12:
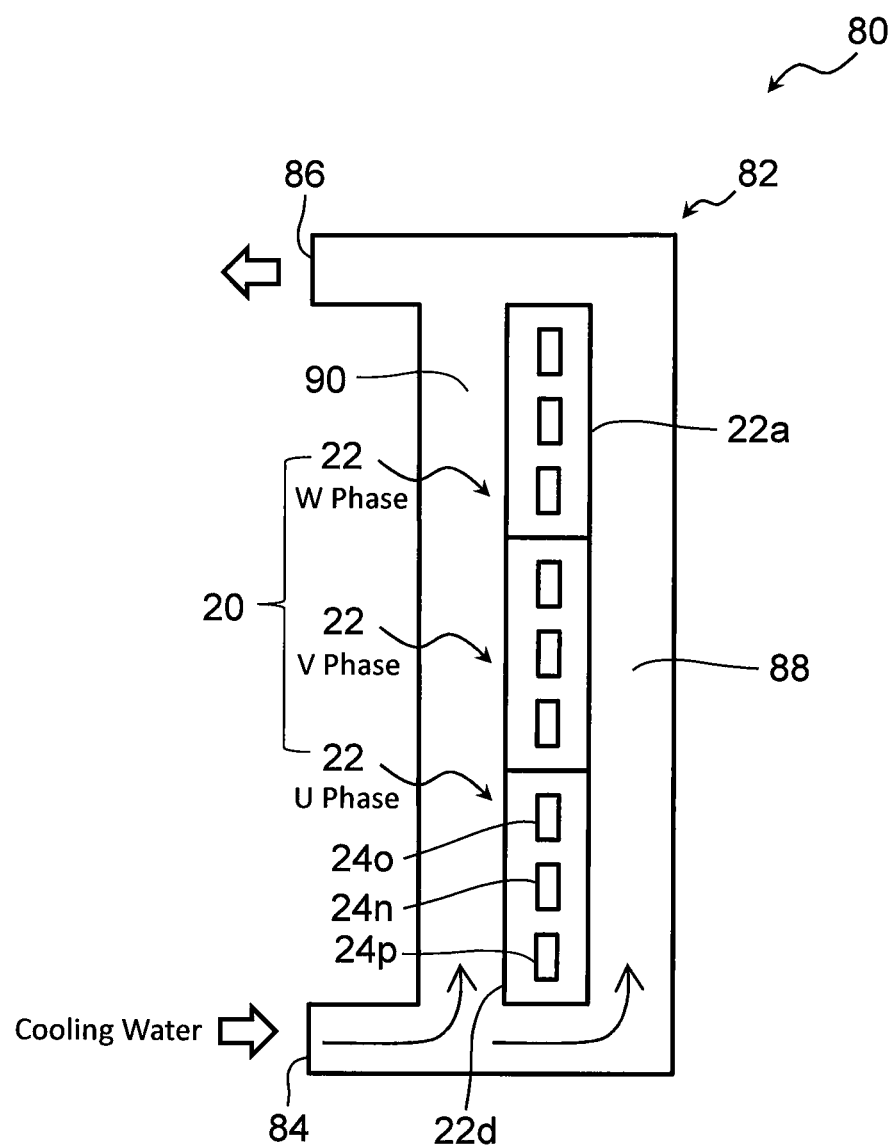
FIG. 12 is a schematic diagram showing an example of a configuration of a cooler included in a power converter according to a fifth embodiment.

Next, a fifth embodiment according to the present disclosure will be described with reference to FIGS. 12 and 13. FIG. 12 is a schematic diagram showing an example of the configuration of a cooler 82 included in a power converter 80 according to the fifth embodiment. The power converter 80 is different from the power converter 70 according to the fourth embodiment in the following points. It should be noted that, in FIG. 12, illustration of the capacitor unit 30, a P bus bar 92p and an N bus bar 92n is omitted.

The power converter 80 includes the cooler 82 configured to cool each power module 22. The cooler 82 is water cooled as an example and includes a cooling water inlet 84, a cooling water outlet 86, a first cooling section 88 and a second cooling section 90. As shown in FIG. 12, the cooler 82 is configured such that cooling water flowing in from the cooling water inlet 84 flows toward the cooling water outlet 86 through the respective flow passages 88a and 90a (see FIG. 13 described below) of the first cooling section 88 and the second cooling section 90.

The first cooling section 88 cools each power module 22 from the side of the module surface (capacitor facing surface) 22a. The second cooling section 90 cools each power module 22 from the side of the module surface 22d located on the side opposite to the capacitor facing surface 22a.

Figure 13:
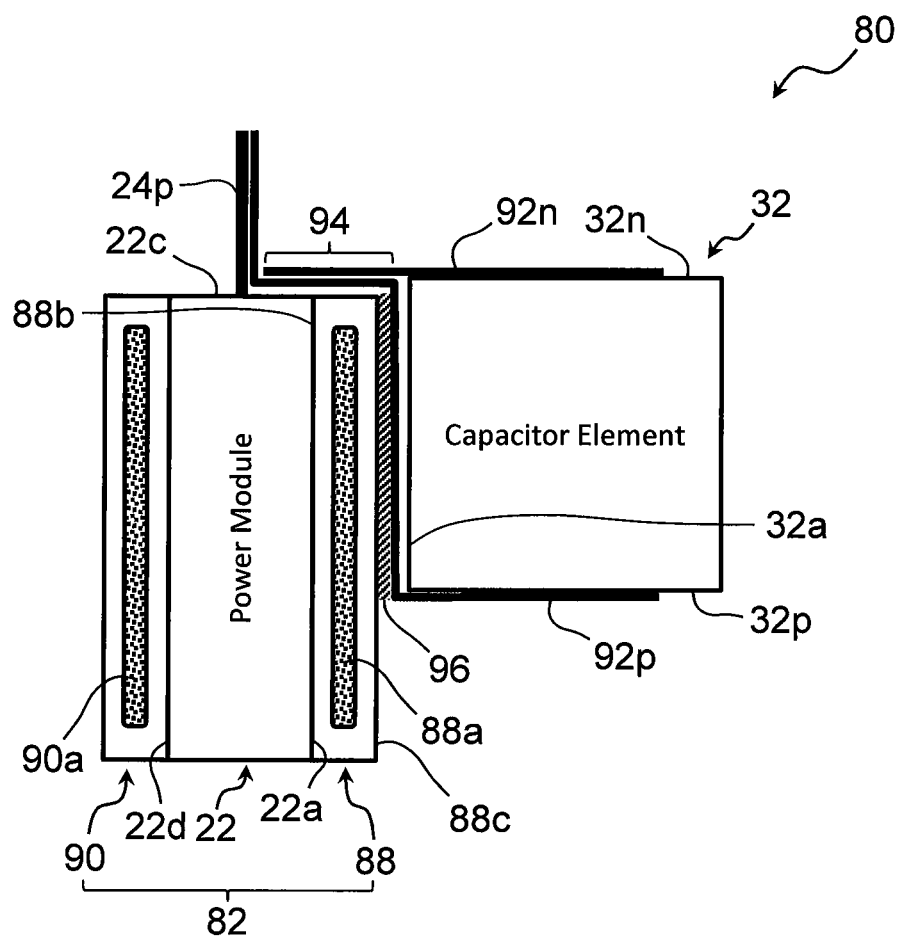
FIG. 13 is a diagram schematically showing a cross section of a main part of the power converter at the position of the positive power terminal similar to FIG. 10.

FIG. 13 is a diagram schematically showing a cross section of a main part of the power converter 80 at the position of the positive power terminal 24p similar to FIG. 10. The arrangement of the bus bars 92p and 92n according to the present embodiment is similar to that of the fourth embodiment. The bus bars 92p and 92n have a bus bar parallel running section 94.

The first cooling section 88 of the cooler 82 has a module contact surface 88b that is in contact with the capacitor facing surface 22a. Also, the first cooling section 88 is in contact (more specifically, is in close contact) with the P bus bar 72p via an insulator 96 at a surface 88c on the side opposite to this module contact surface 88b. An example of the insulator 96 is also an electrically insulating paper.

It should be noted that the module contact surface 88b corresponds to an example of the "first module contact surface" according to the present disclosure, and the insulator 96 corresponds to an example of the "third insulator" according to the present disclosure.

According to the configuration of the fifth embodiment described above, it is possible to cool the P bus bar 92p and the capacitor element 32 using the cooler 82 provided for cooling the power modules 22. In more detail, the surface 88c of the first cooling section 88, which is not utilized for cooling if the configuration as shown in FIG. 13 is not adopted, can be utilized for cooling the P bus bar 92p and the capacitor element 32. Thus, it becomes possible to prevent the P bus bar 92p and the capacitor element 32 from increasing in size from the viewpoint of heat resistance. In other words, it becomes possible to miniaturize the P bus bar 92p and the capacitor element 32.

In addition, even in another example in which a cooler including only the first cooling section 88 located on the side of the capacitor facing surface 22a is provided unlike the cooler 82 shown in FIG. 12, the same effect can also be obtained by including the configuration according to the fifth embodiment. Furthermore, in an example of a bus bar arrangement in which the N bus bar 92n extends along the non-electrode surface 32a of the capacitor element 32 unlike the example shown in FIG. 13, the first cooling section 88 may be in contact (more specifically, be in close contact) with the N bus bar 92n via the insulator 96 at the surface 88c.

6. Sixth Embodiment

Figure 14:
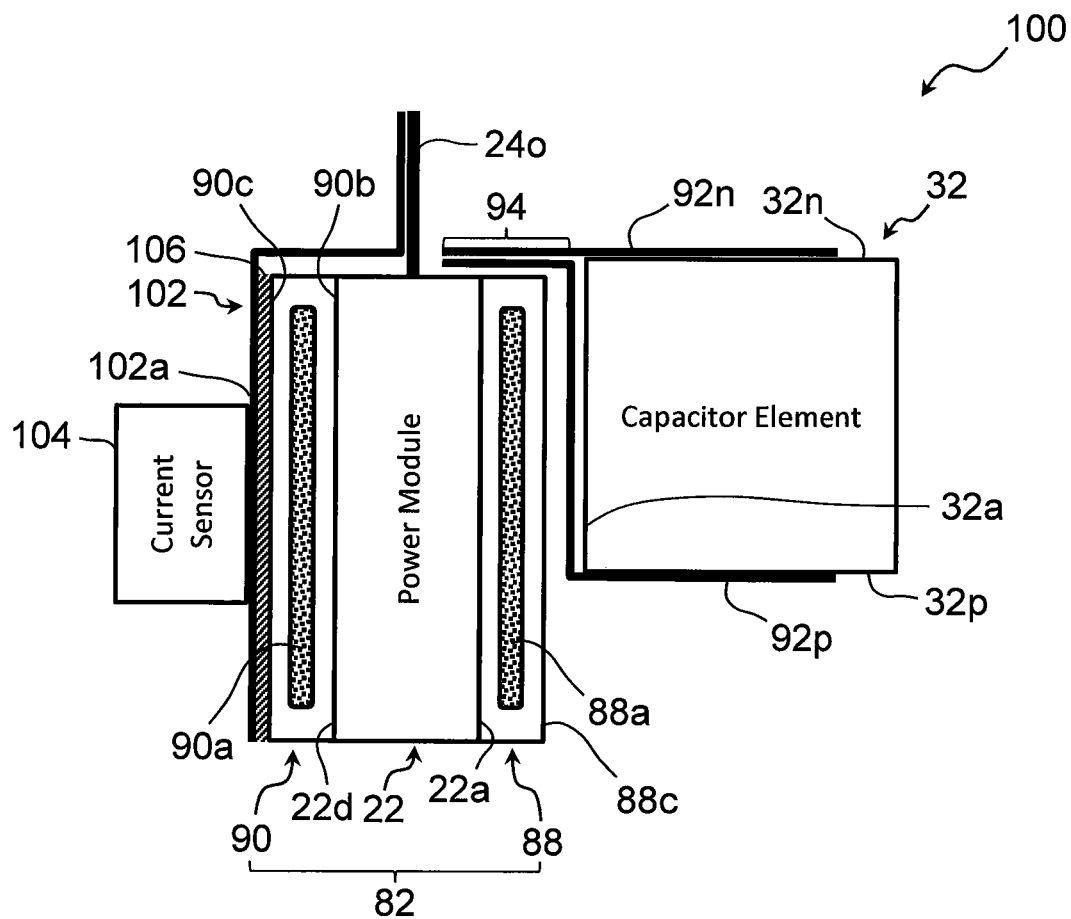
FIG. 14 is a diagram schematically showing a cross section of a main part of a power converter according to a sixth embodiment at the position of an AC power terminal.

Then, a sixth embodiment according to the present disclosure will be described with reference to FIG. 14. FIG. 14 is a diagram schematically showing a cross section of a main part of a power converter 100 according to the sixth embodiment at the position of the AC power terminal 24o. The power converter 100 is different from the power converter 70 according to the fourth embodiment (see FIG. 10) in the following points.

The power converter 100 includes the cooler 82 for cooling each power module 22, similarly to the fifth embodiment. In the example shown in FIG. 14, the surface 88c of the first cooling section 88 is not configured to be in contact with the P bus bar 92p via the insulator 96, but this configuration may be additionally provided similarly to the fifth embodiment.

The power converter 100 includes AC (alternate current) bus bars (also referred to as output bus bars) 102 disposed as shown in FIG. 14. One end of each AC bus bar (also referred to as an "O bus bar") 102 is connected to the power terminal 24o. In the example of the power semiconductor unit 20 having the power module 22 for each phase of U phase, V phase and W phase, the O bus bars 102 are provided for the respective power modules 22. It should be noted that the remaining end of each O bus bar 102 is connected to the above described motor generator via a conductive wire (not shown).

The power converter 100 further includes current sensors 104. In order to detect an electric current value of each of the three phases, the current sensors 104 are attached to the respective O bus bars 102 as an example. However, the current sensors 104 may be provided only in any two of the O bus bars 102 in order to detect electric current values of two phases. Then, the remaining one-phase electric current value may be calculated based on the detected values of the two-phase electric currents.

The second cooling section 90 of the cooler 82 has a module contact surface 90b that is in contact with the module surface 22d of the power module 22 located on the side opposite to the capacitor facing surface 22a. On that basis, the second cooling section 90 is in contact (more specifically, in close contact) with each O bus bar 102 via an insulator 106 at a surface 90c on the side opposite to the module contact surface 90b. An example of the insulator 106 is also an electrically insulating paper.

It should be noted that the module surface 22d corresponds to an example of the "second module surface" according to the present disclosure, the module contact surface 90b corresponds to an example of the "second module contact surface" according to the present disclosure, and the insulator 106 corresponds to an example of the "fourth insulator" according to the present disclosure.

More specifically, in the example shown in FIG. 14, the current sensor 104 is disposed on a portion 102a of the O bus bar 102 that is in contact with the power module 22 via the insulator 106.

According to the configuration of the sixth embodiment described above, the cooler 82 provided for cooling the power modules 22 can be utilized to cool the O bus bars 102 and the current sensors 104. More specifically, the surface 90c of the second cooling section 90, which is not utilized for cooling if a configuration such as that shown in FIG. 14 is not adopted, can be utilized for cooling each O bus bar 102 and each current sensor 104. Thus, it becomes possible to prevent the O bus bars 102 from increasing in size from the viewpoint of heat resistance. In other words, it becomes possible to miniaturize the O bus bars 102. In addition, the heat resistance of the current sensors 104 can be reduced. This leads to a cost reduction of the current sensors 104.

Furthermore, the arrangement location of each current sensor 104 is not necessarily limited to the portion 102a, and the effect of cooling the current sensors 104 via the O bus bars 102 can be expected, as long as the current sensors 104 are disposed on the O bus bars 102. However, by disposing each current sensor 104 on the portion 102a that is in contact with the power module 22 via the insulator 106, the current sensors 104 can be effectively cooled.

Additionally, even in another example in which a cooler including only the second cooling section 90 located on the side of the O bus bar 102 is provided unlike the cooler 82 shown in FIG. 14, the same effect can also be obtained by including the configuration according to the sixth embodiment.

The embodiments and modification examples described above may be combined in other ways than those explicitly described above as required and may be modified in various ways without departing from the scope of the present disclosure.

What is claimed is:

1. A power converter comprising:
   a capacitor element configured to smooth a DC voltage supplied from a battery;
   a power semiconductor module that includes a semiconductor switching element, a positive power terminal and a negative power terminal, and converts DC power from the capacitor element into AC power; and
   a positive electrode bus bar and a negative electrode bus bar that are formed to transfer DC power between the capacitor element and the power semiconductor module, wherein
   the power semiconductor module includes a power terminal arrangement surface being a surface that does not face the capacitor element,
   the positive power terminal and the negative power terminal are arranged so as to protrude from the power terminal arrangement surface,
   the positive electrode bus bar and the negative electrode bus bar gather with each other after at least one of the positive electrode bus bar and the negative electrode bus bar extends along a non-electrode surface of the capacitor element, and then run side by side in a bus bar parallel running section, the positive electrode bus bar runs in parallel with the negative electrode bus bar in the bus bar parallel running section, and then extends along the positive power terminal from a proximal end of the positive power terminal located on a side of the power terminal arrangement surface to a distal end of the positive power terminal located farther from the power terminal arrangement surface than the proximal end, and the negative electrode bus bar runs in parallel with the positive electrode bus bar in the bus bar parallel running section, and then extends along the negative power terminal from a proximal end of the negative power terminal located on a side of the power terminal arrangement surface to a distal end of the negative power terminal located farther from the power terminal arrangement surface than the proximal end.

2. The power converter according to claim 1, wherein the positive electrode bus bar is in contact with the negative electrode bus bar via a first insulator in the bus bar parallel running section.

3. The power converter according to claim 1, wherein at least one of the positive electrode bus bar and the negative electrode bus bar is in contact with the non-electrode surface of the capacitor element via a second insulator.

4. The power converter according to claim 1, wherein the power semiconductor module is formed in a substantially rectangular parallelepiped shape and includes a capacitor facing surface being a surface that faces the capacitor element, the power terminal arrangement surface is located on a side opposite to the capacitor facing surface, the bus bar parallel running section includes a module parallel running section that runs along a first module surface, the first module surface being one of widest surfaces of the power semiconductor module and being located between the capacitor facing surface and the power terminal arrangement surface, and the power semiconductor module is formed such that a length of a side connecting the first module surface with a module surface located on a side opposite to the first module surface becomes shorter than a length of each of sides forming the first module surface.

5. The power converter according to claim 1, wherein the power semiconductor module is formed in a substantially rectangular parallelepiped shape and includes a capacitor facing surface being a surface that faces the capacitor element, the power terminal arrangement surface is one of surfaces adjacent to the capacitor facing surface, and either the positive electrode bus bar or the negative electrode bus bar is located between the capacitor facing surface and a surface of the capacitor element that faces the capacitor facing surface.

6. The power converter according to claim 5, further comprising a cooler configured to cool the power semiconductor module, wherein the cooler includes a first cooling section having a first module contact surface that is in contact with the capacitor facing surface, and the first cooling section is in contact with either the positive electrode bus bar or the negative electrode bus bar via a third insulator at a surface on a side opposite to the first module contact surface.

7. The power converter according to claim 5, wherein the power semiconductor module includes an AC power terminal, the power converter further comprises:

a cooler configured to cool the power semiconductor module;

an AC bus bar connected to the AC power terminal; and a current sensor attached to the AC bus bar, the cooler includes a second cooling section having a second module contact surface that is in contact with a second module surface of the power semiconductor module located on a side opposite to the capacitor facing surface, and the second cooling section is in contact with the AC bus bar via a fourth insulator at a surface on a side opposite to the second module contact surface.

8. A power converter comprising:

a capacitor element configured to smooth a DC voltage supplied from a battery;

a power semiconductor module that includes a semiconductor switching element, a positive power terminal and a negative power terminal, and converts DC power from the capacitor element into AC power; and a positive electrode bus bar and a negative electrode bus bar that are formed to transfer DC power between the capacitor element and the power semiconductor module, wherein the power semiconductor module includes a power terminal arrangement surface being a surface that does not face the capacitor element, the positive power terminal and the negative power terminal are arranged so as to protrude from the power terminal arrangement surface, the positive electrode bus bar and the negative electrode bus bar gather with each other after at least one of the positive electrode bus bar and the negative electrode bus bar extends along a non-electrode surface of the capacitor element, and then run side by side in a bus bar parallel running section, the positive electrode bus bar runs in parallel with the negative electrode bus bar in the bus bar parallel running section, and then extends along the positive power terminal from a proximal end of the positive power terminal to a distal end of the positive power terminal, the negative electrode bus bar runs in parallel with the positive electrode bus bar in the bus bar parallel running section, and then extends along the negative power terminal from a proximal end of the negative power terminal to a distal end of the negative power terminal, the power semiconductor module is formed in a substantially rectangular parallelepiped shape and includes a capacitor facing surface being a surface that faces the capacitor element, the power terminal arrangement surface is located on a side opposite to the capacitor facing surface, the bus bar parallel running section includes a module parallel running section that runs along a first module surface, the first module surface being one of widest surfaces of the power semiconductor module and being located between the capacitor facing surface and the power terminal arrangement surface, and the power semiconductor module is formed such that a length of a side connecting the first module surface with a module surface located on a side opposite to the first module surface becomes shorter than a length of each of sides forming the first module surface.

9. The power converter according to claim 8, wherein the positive electrode bus bar is in contact with the negative electrode bus bar via a first insulator in the bus bar parallel running section.

10. The power converter according to claim 8, wherein at least one of the positive electrode bus bar and the negative electrode bus bar is in contact with the non-electrode surface of the capacitor element via a second insulator.

11. A power converter comprising:

a capacitor element configured to smooth a DC voltage supplied from a battery;

a power semiconductor module that includes a semiconductor switching element, a positive power terminal and a negative power terminal, and converts DC power from the capacitor element into AC power; and a positive electrode bus bar and a negative electrode bus bar that are formed to transfer DC power between the capacitor element and the power semiconductor module, wherein the power semiconductor module includes a power terminal arrangement surface being a surface that does not face the capacitor element, the positive power terminal and the negative power terminal are arranged so as to protrude from the power terminal arrangement surface, the positive electrode bus bar and the negative electrode bus bar gather with each other after at least one of the positive electrode bus bar and the negative electrode bus bar extends along a non-electrode surface of the capacitor element, and then run side by side in a bus bar parallel running section, the positive electrode bus bar runs in parallel with the negative electrode bus bar in the bus bar parallel running section, and then extends along the positive power terminal from a proximal end of the positive power terminal to a distal end of the positive power terminal, the negative electrode bus bar runs in parallel with the positive electrode bus bar in the bus bar parallel running section, and then extends along the negative power terminal from a proximal end of the negative power terminal to a distal end of the negative power terminal, the power semiconductor module is formed in a substantially rectangular parallelepiped shape and includes a capacitor facing surface being a surface that faces the capacitor element, the power terminal arrangement surface is one of surfaces adjacent to the capacitor facing surface, either the positive electrode bus bar or the negative electrode bus bar is located between the capacitor facing surface and a surface of the capacitor element that faces the capacitor facing surface, the power semiconductor module includes an AC power terminal, the power converter further comprises:

a cooler configured to cool the power semiconductor module;

an AC bus bar connected to the AC power terminal; and a current sensor attached to the AC bus bar, the cooler includes a second cooling section having a second module contact surface that is in contact with a second module surface of the power semiconductor module located on a side opposite to the capacitor facing surface, and the second cooling section is in contact with the AC bus bar via a fourth insulator at a surface on a side opposite to the second module contact surface.

12. The power converter according to claim 11, wherein the cooler includes a first cooling section having a first module contact surface that is in contact with the capacitor facing surface, and the first cooling section is in contact with either the positive electrode bus bar or the negative electrode bus bar via a third insulator at a surface on a side opposite to the first module contact surface.

13. The power converter according to claim 11, wherein the positive electrode bus bar is in contact with the negative electrode bus bar via a first insulator in the bus bar parallel running section.

14. The power converter according to claim 11, wherein at least one of the positive electrode bus bar and the negative electrode bus bar is in contact with the non-electrode surface of the capacitor element via a second insulator.

* * * * *